United States Patent [19]

Miyajima

[11] 4,110,520

[45] Aug. 29, 1978

[54] MODIFICATION OF WATER-SOLUBLE ACRYLIC POLYMER

[75] Inventor: Tohru Miyajima, Ebina, Japan

[73] Assignees: Kyoritsu Yuki Co., Ltd.; Mitsubishi Chemical Industries Limited, both of Tokyo, Japan

[21] Appl. No.: 751,671

[22] Filed: Dec. 17, 1976

[51] Int. Cl.$^2$ .......................... C08F 8/10; C08F 8/12; C08F 8/50; C08F 8/34
[52] U.S. Cl. ......................................... 526/27; 526/2; 526/3; 526/4; 526/30; 526/41; 526/47.7; 526/55; 528/487
[58] Field of Search ............... 526/2, 3, 4, 41, 30, 526/49, 23, 27, 47.7, 55; 528/487

[56] References Cited

U.S. PATENT DOCUMENTS 3,215,680  11/1965  Kolodny ........................... 526/303

OTHER PUBLICATIONS

Schiller et al., "Ionic Derivatives of Polyarylamide," Industrial & Eng. Chem., pp. 3132–3137 (48), 1956.

*Primary Examiner*—William F. Hamrock
*Attorney, Agent, or Firm*—Oblon, Fisher, Spivak, McClelland & Maier

[57] ABSTRACT

Modification reaction of water-soluble polymers such as hydrolysis, sulfomethylation, the Hofmann degradation or the Mannich reaction of polyacrylamide are carried out by dispersing the polymer in an aqueous solution of water soluble salt of an alkali metal or magnesium and a di or polybasic inorganic acid and contacting the dispersed polymer with a modifying agent.

12 Claims, No Drawings

MODIFICATION OF WATER-SOLUBLE ACRYLIC POLYMER

BACKGROUND OF THE INVENTION

This invention relates to the modification of a water-soluble acrylic polymer, and more particularly to a process for modifying a water-soluble acrylic polymer to form a water-soluble modified product.

Polyacrylamide which is a water-soluble high polymer serves in many commercial fields as a flocculant, a thickener, a chemical agent for paper manufacture, etc.

Various modified polymer of polyacrylamide, that is, polyacrylamide derivatives, carbamoyl groups of which are partially substituted with other substituents, also have a wide range of application as well as polyacrylamide.

The modification of polyacrylamide is generally carried out by adding a reagent required for the modification to an aqueous solution of the polymer. This method, however, is only applicable when the concentration of polymer in the solution is less than about 20%, because an increase in the concentration makes the polymer solution considerably viscous and the viscous solution is handled with difficulty. As a result of this, a large amount of water should be removed in order to obtain a modified polyacrylamide product in a solid form. If the modified polyacrylamide product is served for commercial use without the removal of water, thus in the solution form, it is very inconvenient for handling and transporting.

There is disclosed in German Patent Specification No. 1,220,610 a method for overcoming the above-described drawbacks, in which method a polymer is made contact with a particular reagent in the mixture of small amount of water and an organic solvent which does not dissolve the initially charged polymer nor the modified product thereof and is insoluble in water. Since it is desired to carry out the reaction uniformly, the polymer should be in the form of possible finest particle so that the polymer has a larger contacting surface area. However, when the size of polymer particles is smaller, during the swelling of the polymer with the reagent the moisture content in the surface portions of polymer particles increases. Thus the adhesiveness of particles increases so that the particles adhere to each other to form a mass, resulting in a nonuniform reaction. This shows that there is a certain limit on the size of polymer particles. Furthermore, it is not preferable from the safety maintenance viewpoint to use a large amount of the organic solvent which is combustible.

SUMMARY OF THE INVENTION

Therefore, it is an object of this invention to obviate the above-described drawbacks and to provide a commercially advantageous process for the modification of water-soluble polymers such as polyacrylamide.

This invention is based on the recognition of the fact that when a water-soluble polymer is dispersed in an aqueous solution of a selected salt the elution of polymer is prevented so that the polymer particle is maintained sufficiently low in adhesiveness and this polymer is effectively and uniformly subjected to modification.

According to this invention there is provided a process for modifying at least one water-soluble high polymer selected from the group consisting of polyacrylamide, polymethacrylamide, copolymers composed mainly of acrylamide, and copolymers composed mainly of methacrylamide, characterized in that said water-soluble high polymer is dispersed in an aqueous solution of water-soluble salt of an alkali metal or magnesium salt of a dibasic or more basic acid to prevent the elution of said high polymer and then made contact with a modifying reagent in said solution.

DESCRIPTION OF THE EMBODIMENTS

Examples of the water-soluble high polymer which can be used as a starting material in the process according to this invention include a homopolymer of acrylamide or methacrylamide, copolymers of acrylamide and methacrylamide, and water-soluble copolymers of a large amount (at least 50 mole %) of acrylamide or methacrylamide and other polymeric monomers. The polymeric monomers to form the water-soluble copolymers with acrylamide or methacrylamide may be acrylic acid or its salt, methacrylic acid or its salt, vinyl acetate, acrylonitrile, acrylic esters, dialkylaminoalkyl acrylate or methacrylate, N-vinylpyrrolidone, N-vinylpyridine, N-dialkyl acrylamide, N-dialkyl methacrylamide, styrene, etc. Polyacrylamide and polymethacrylamide, carbamoyl groups of which have been partially substituted through the modification may also be used as the polymer. If a monomer possesses ionic groups such as carboxyl and quaternary amino groups, such monomer units should be less than 15 mole %, preferably less than 10 mole % in the copolymer; otherwise the polymer in the aqueous solution of the salt becomes more hydrophillic and viscous, inhibiting the reaction (modification). The water-soluble polymer used in the process has a molecular weight of more than about 200,000.

The preparation of the polymer or copolymer employed herein can be effected in an unlimited manner by any conventional polymerization method. The preferred polymer or copolymer is prepared in the form of powder or aqueous solution (hydrous gel).

Examples of water soluble salts of the alkali metal and magnesium salts of the dibasic or more basic acid which can be used in the process according to this invention include sulfates, carbonates, phosphates, hydrogenphosphates and other salts of sodium, potassium and magnesium. For example, $K_2CO_3$, $Na_2Co_3$, $Na_2SO_4$, $MgSO_4$, $K_2HPO_4$, $Na_2HPO_4$, $Na_3PO_4$, etc. can be employed. The salt should be selected to accommodate with the desired modification reaction. The concentration of the salt in the aqueous solution can vary over wide limits in accordance with kinds of the salt and the water-soluble high polymer to be used and the modification reaction to be carried out. However, the concentration should be at the level sufficient to prevent the elution of the water-soluble polymer charged and the increase in its adhesion. In general, the concentration of the salt in the aqueous solution in which the water-soluble polymer is dispersed is not less than 15 wt %, preferably more than 20 wt % based on the salt and water.

The reagent, modifier, employed herein depends on the kind of modification as described hereinafter. The reagent can be directly added to the aqueous solution of the salt. A solution of the reagent in water can also be added. In the latter case the amount of water changes more or less the concentration of the salt solution. The amount of water to be added together with the reagent is generally so small that the change in concentration is negligible. When the amount of water is comparatively larger, the influence of water on the concentration of the salt solution should be considered.

The modification reaction of the water-soluble polymer which is carried out in the aqueous solution of the salt according to this invention includes hydrolysis, the Hofmann degradation, methylolation, sulfomethylation, the Mannich reaction (aminoalkylation) of carbamoyl groups, conversion of tertiary to quaternary amino groups, and the like. These reactions can be carried out by the conventional, well-known methods, respectively (see, for example, Industrial and Engineering Chemistry, Vol. 48, No. 12, pages 2132–2137).

Embodiments of the typical reactions will be illustrated below.

Hydrolysis: An alkaline material is used as the reagent. In the present invention, it is preferable to use an alkaline salt such as carbonates phosphates and hydrogen phosphates, as the salt in the aqueous solution, and also as the reagent for hydrolysis. Furthermore, application of heat is required. The reaction is carried out at a temperature of 30°–50° C. for 15–60 minutes. An aqueous solution of a neutral salt can, of course, be used. In this case caustic alkali is used as an alkaline reagent. Extention of the reaction time or the addition of caustic alkali will ensure for the rate of hydrolysis to be more than 10%.

Sulfomethylation: The reagent is a mixture of formaldehyde and sodium sulfite. The reaction is carried out in an aqueous solution of an alkaline salt such as carbonates, phosphates and hydrogen phosphates at a temperature of 40° C. for 30–60 minutes.

The Hofmann degradation: The reagent is a mixture of sodium hypochlorite and sodium hydroxide. The reaction is carried out in an aqueous solution of an alkaline salt such as carbonates phosphates and hydrogen phosphates at a temperature of 30° C. for 30–120 minutes.

The Mannich reaction: The reagent is a mixture of formaldehyde and a primary or secondary amine in a molar ratio of 1:1–2. The reaction is carried out at a temperature of 25°–70° C. for ½–24 hours. Examples of the amine used herein include primary or secondary amines having $C_1$ - $C_3$ alkyl or $C_1$ - $C_3$ alkanol groups, morpholine, piperidine, and mixtures thereof. In stead of formaldehyde paraformaldehyde, trioxane, formalin and the like may also be used. The salt to be dissolved in the aqueous solution is a neutral salt such as sodium sulfate and magnesium sulfate.

Conversion of tertiary to quaternary amino groups: The reagent is dialkyl sulfate and the salt in the aqueous solution is a neutral salt such as sodium sulfate and magnesium sulfate.

While a water-soluble polymer is dispersed in an aqueous solution of at least one alkali metal or magnesium salt of a dibasic, tribasic or more basic acid and then made contact with a modifying reagent in accordance with this invention, it is preferable to disperse the water-soluble polymer finely so as to achieve the uniform reaction. The specific surface area of the polymer should be at least 2 $cm^2/cm^3$. The water-soluble polymer can be either amorphous or porous and be formed in any shape, preferably in the shape of particle, strip, sheet and the like. For example, on aminomethylation, preferred shapes of the polymer are a particle having a grain size of not more than 10 mm, a strip having a diameter of not more than 10 mm, a sheet having a thickness of not more than 10 mm, and the like.

During the reaction of the water-soluble polymer with the modifying reagent the water-soluble polymer is not eluted from the aqueous solution of the salt, does not become adhesive and maintains its moisture content adequately. The modification need not necessarily be completed in the aqueous solution of the salt, provided that the modifying reagent has been absorbed in the water-soluble polymer. After the absorption, the polymer can be separated from the aqueous solution of the salt and the reaction (modification) can proceed without the aqueous solution. If desired, the separated polymer may be formed in any suitable shape. In these conditions the reaction still continues. The reaction terminates as soon as the reagent has completely been consumed or the moisture has disappeared.

During or after the reaction the polymer can be separated from the aqueous solution of the salt in any suitable manner, for example, by centrifugal separation, filtration, flotation, compression and the like.

The modified polymer which has finished its modification and has been separated from the aqueous solution of the salt can be dried or dehydrated in any convenient manner, for example, by extraction of water with acetone or methanol, azeotropic distillation, freeze drying, heat drying and the like. There is obtained the water-soluble modified product in a solid state.

Furthermore, a part of the salt may remain in the modified polymer even after the latter has been separated from the aqueous solution of the salt. The presence of the salt in the polymer is of advantage in preventing the change of properties of the polymer during the above dehydration.

The invention will now be illustrated in greater detail in the following examples. In the examples, unless otherwise stated, "percentage" stands for percentage by weight.

EXAMPLE 1

Into a 500 ml separable flask were placed 30 g of acrylamide and 170 g of deionized water. Nitrogen gas was passed through the solution for 30 minutes to remove the dissolved oxygen. Into the flask was introduced 0.3 ml of an aqueous solution containing 1% potassium persulfate. The resultant solution was allowed to stand at a temperature of 40° C. for 20 hours to carry out the polymerization. A part of thus obtained aqueous solution of polyacrylamide was diluted to decrease the concentration of polymer to 1% and then the viscosity was determined by means of a B type viscometer (No. 2 rotor, 30 rpm). The viscosity was found to be 760 cps. Further, the unreacted acrylamide was weighed, which showed the rate of polymerization to be 99.3%.

Into a mixer 100 g of the aqueous solution of polyacrylamide obtained by the above polymerization, 120 g of potassium carbonate and 280 g of water were placed and these contents were vigorously stirred for three minutes. There was obtained a suspension of polyacrylamide particles having a grain size of 0.5 mm. After this suspension had been stirred at a temperature of 70° C. for 15 minutes, the suspension containing the hydrolyzed polyacrylamide was dehydrated by filtration and then dried under reduced pressure. After 24 hours of drying, the dried product was dissolved in water and then was subjected to colloidal titration to determine the rate of hydrolysis, which was found to be 7 mol %.

EXAMPLE 2

Into a mixer 100 g of the aqueous solution of polyacrylamide prepared in Example 1, 80 g of potassium carbonate, and 320 g of water were placed and stirred. There was obtained a suspension of polyacrylamide particles having a grain size of 0.4 mm. This suspension was filtered by suction with a Buchner funnel to remove water. The resultant mass consisted of 50 g of water, 40% of the polymer, and 10% of potassium carbonate. This mass was heated to promote hydrolysis, while the heat was applied in a manner to prevent drying. Heating conditions (temperature and time) and the rate of hydrolysis (determined by colloidal titration) in each run are shown in Table 1.

Table 1

| Temperature (° C) | Time (hour) | Rate of hydrolysis (mole %) |
|---|---|---|
| 40 | ½ | 2 |
| 60 | ½ | 4 |
| 60 | 1 | 7 |
| 60 | 24 | 11 |

EXAMPLE 3

A flocculant, "Himoloc SS-200" (a trademark of polyacrylamide powder manufactured by Kyoritsu Yuki Co., the viscosity of 1% aqueous solution 600 cps), was finely divided into particles which can pass through a 200 mesh screen. Into a 500 ml separatory flask was placed 200 ml of an aqueous solution containing 40% sodium sulfate and then 30 g of said polymer particles was suspended therein. Further, 40 g of sodium sulfate, 100 ml of an aqueous solution containing 40% dimethylamine, and 30 ml of formalin were added. The reaction was carried out at a temperature of 40° C for three hours with stirring, yielding the modified polymer in a rate of aminomethylation (the Mannich reaction) of 68 mole %.

EXAMPLE 4

To a 400 g portion of the reaction mixture prepared in Example 3 was added 100 ml of diethyl sulfate. The mixture was stirred to achieve the uniform dispersion. This uniformly dispersed solution was immediately filtered by suction with a Buchner funnel. There was obtained a mass which consisted of 23% of sodium sulfate, 35% of the polymer, and 42% of volatile materials. This mass was allowed to stand at a temperature of 5° C. for 24 hours and then subjected to colloidal titration. It was found that the modified polymer contained 38 mole % of quaternary aminomethylamide groups and 26 mole % of tertiary aminomethylamide groups.

EXAMPLE 5

In 7 kg of deionized water was dissolved 3 kg of acrylamide. Nitrogen gas was passed through the solution for 30 minutes to remove the dissolved oxygen, while the temperature was adjusted to 15° C. Then 0.5 g of ammonium persulfate and 0.3 g of sodium bisulfite as initiators were added to the solution. The polymerization started after one minute and terminated after three hours. There was obtained an aqueous solution which contained 30% of polyacrylamide having an average molecular weight of 1,500,000.

This aqueous solution of the polymer was placed in a chopper and the polymer was chopped into particles having a grain size of about 5 mm. The chopped polymer was then subjected to the following modification.

Into a 500 ml, three-necked separatory flask were placed predetermined amounts of the chopped polymer and an aqueous solution of sodium sulfate and then predetermined amounts of dimethylamine and paraformaldehyde were added with stirring. The Mannich reaction, aminomethylation, was carried out at a temperature of 40° C. for 2 hours. After the reaction the modified polymer was separated by filtration with a screen. And then dried in a sufficient amount of acetone, obtaining the polymer in a solid state. The rate of aminomethylation of the polymer was determined as follows. First, the modified polymer was diluted with water to form a 1% aqueous solution. After the polymer solution had been adjusted to be acidic by adding acetic acid, it was subjected to colloidal titration with polyvinylsulfate potassium salt in the presence of toluidine blue used as an indicator. The results are shown in Table 2.

Table 2

| | 1 | 2 | 3 | 4 | 5* |
|---|---|---|---|---|---|
| Kind of salt | $Na_2SO_4$ | $Na_2SO_4$ | $Na_2SO_4$ | $Na_2SO_4$ | $(NH_4)_2SO_4$ |
| Salt (g) | 100 | 200 | 50 | 100 | 100 |
| Water (g) | 200 | 200 | 200 | 200 | 200 |
| 30 % Polymer (g) | 100 | 100 | 100 | 100 | 100 |
| Aqueous solution of 40 % dimethylamine (g) | 26 | 26 | 26 | 60 | 26 |
| Paraformaldehyde (g) | 6.5 | 6.5 | 6.5 | 13 | 6.5 |
| Reaction temperature (° C) | 40 | 40 | 40 | 40 | 40 |
| Reaction Time (hr.) | 2 | 2 | 2 | 2 | 2 |
| Rate of aminomethylation (mole %) | 37 | 36.5 | 35 | 54 | 0.6 |
| solubility (%) | 100 | 100 | 100 | 100 | 100 |

*a comparative run

EXAMPLE 6

Into a 1 l, three-necked separatory flask were placed 400 g of water, 180 g of sodium sulfate, and 200 g of polyacrylamide prepared in Example 5. With stirring a cooled mixture which had previously been prepared by mixing 60 g of an aqueous solution containing 40% dimethylamine with 34 g of formalin was added to the solution in the flask. The reaction system was maintained at a temperature of 33° C. to carry out the aminomethylation. As the reaction proceeded, the solution was sampled at predetermined points of time. Samples of the reaction solution were dried in acetone and then diluted with water so as to give aqueous solutions containing 1% of the polymer, which were subjected to colloidal titration for determining the rate of aminomethylation, respectively. The results are shown in Table 3.

Table 3

| Reaction time | Rate of aminomethylation | Solubility |
|---|---|---|
| ½ hour | 29.8% | 100 % |
| 1 | 32.5 | do |
| 2 | 36.2 | do |
| 3 | 37.0 | do |
| 4 | 37.8 | do |

Table 3-continued

| Reaction time | Rate of aminomethylation | Solubility |
|---|---|---|
| 6 | 37.5 | do |
| 8 | 37.5 | do |
| 12 | 35.8 | do |
| 24 | 34.7 | do |
| 36 | 30.3 | Small amounts of insolubles |
| 48 | 25.4 | do |

EXAMPLE 7

As a starting polymer granular polyacrylamide was made by an emulsion polymerization process. Analysis showed that the polymer had a molecular weight of 2,800,000 and a moisture content of 3% and 0.8 mole % of amide groups was hydrolyzed in to sodium carboxylate form.

Into a 500 ml, three-necked separatory flask were placed 300 g of water and 100 g of magnesium sulfate and then 50 g of said granular polyacrylamide was added thereto with stirring. The granular polyacrylamide was swelled. To these contents were then added 22 g of an aqueous solution containing 30% methylamine and 16 g of methylaminoethanol and subsequently 10 g of paraformaldehyde. With stirring, the reaction system was held at a temperature of 35° C. for 3 hours to carry out the Mannich reaction.

After the reaction had terminated, the reaction solution was filtered with a screen to separate and dehydrate the modified polymer, the moisture content of which was found to be 51%. The polymer was dipped in a mixture of 200 g of water and 200 g of potassium carbonate. This was done for the salting-out of the polymer. The moisture content was decreased to 45%. Then the polymer was dried at a temperature of 60° C. in a hot-air ventilating dryer, obtaining granular polyacrylamide partially modified by the Mannich reaction.

The modified polymer was diluted with water to form a 1% aqueous solution, which was then subjected colloidal titration to determine the rate of aminoalkylation. It was found that 23 % of amide groups had been aminoalkylated (subjected to the Mannich reaction).

EXAMPLE 8

In 500 g of deionized water were dissolved 300 g of acrylamide and 100 g of N-dimethylacrylamide. Nitrogen gas was passed through the solution for 30 minutes to remove the dissolved oxygen, while the system was maintained at a temperature of 25° C. Then 0.1 g of ammonium persulfate and 0.05 g of sodium bisulfite as initiators were added to the solution. The polymerization started after 30 minutes and terminated after three hours. There was obtained an aqueous solution which contained 40% of an acrylamide-N-dimethylacrylamide copolymer having an average molecular weight of 950,000.

This aqueous solution of the copolymer was placed in a chopper and the copolymer was chopped into particles having a grain size of about 3 mm. The chopped copolymer was then subjected to the following aminomethylation.

Into a 500 ml, three-necked separatory flask were placed 200 g of water, 100 g of sodium sulfate, 17 g of formalin and 30 g of 40% dimethylamine solution with stirring. Stirring was stopped and the mixed solution was allowed to stand. After a certain period of time two phases separated out one of which was an aqueous solution of sodium sulfate and the other was possibly dimethylaminoalcohol. To the system consisting of two phases was added 100 g of the chopped copolymer with stirring. The reaction, i.e., aminomethylation was carried out at a temperature of 45° C for 1 hour. The reaction solution was dehydrated by centrifugal separation, obtaining the modified copolymer having a moisture content of 49%. This copolymer was further dried at a heating temperature of 50° C under a reduced pressure of 20 mmHg for 6 hours, obtaining in a solid state aminomethylated coplymers of acrylamide and N-dimethylacrylamide having a moisture content of 6.4%. Thus obtained solid product can easily be ground into particles having a desired grain size. The powdered copolymer was thoroughly dissolvable in water.

EXAMPLE 9

On a stainless steel belt the aqueous solution of acrylamide in a concentration of 50% was polymerized to give a sheet (10 mm in thickness) of polyacrylamide having an average molecular weight of 3,200,000. The sheet was cut into pieces of 200 mm × 300 mm which were used as a starting material for aminomethylation.

Into a stainless steel vessel of 250 mm × 250 mm × 400 mm (in height) were placed 18 kg of water and 8 kg of sodium sulfate. Five pieces cut from the sheet of polyacrylamide were mechanically suspended in the vessel. While the aqueous solution of sodium sulfate was pumped and circulated at a flow rate of 5 l/min in the vessel, 3 kg of an aqueous solution containing 40% dimethylamine was added thereto and then 0.6 kg of paraformaldehyde. The temperature in the reaction vessel was 33° C. before the addition of paraformaldehyde and increased to 39° C. after the addition. In these conditions, the aminomethylation was carried out for 2 hours with continous circulation. The temperature in the vessel was 30° C. after the termination of reaction. The product was separated in a similar manner as described above, dried at a temperature of 60° C. in a hot-air ventilating dryer and then ground. There was obtained partially aminomethylated polyacrylamide powder.

A portion of the powder was diluted with water to form a 1% aqueous solution, which was then subjected to colloidal titration to determine the rate of aminomethylation. It was found that 12 mol % of amide groups had been aminomethylated.

What is claimed is:

1. A process for the modification of a water-soluble high polymer, which comprises: dispersing at least one water-soluble high polymer selected from the group consisting of polyacrylamide, polymethacrylamide, copolymers composed mainly of acrylamide, and copolymers composed mainly of methacrylamide in an aqueous solution of a water-soluble salt, said salt selected from the group consisting of alkali metal and magnesium salts of dibasic and more basic inorganic acids, wherein the concentration of said salt in said aqueous solution is sufficient to prevent the elution of said polymer from said solution and is not less than 15 wt. % based on the amount of salt in water; and contacting said water-soluble high polymer dispersed in the aqueous solution with a modifier to modify said high polymer.

2. The process of claim 1 wherein said alkali metal or magnesium salt of the dibasic or more basic inorganic acid is selected from the group consisting of sodium carbonate, potassium carbonate, sodium phosphate, potassium phosphate, sodium hydrogenphosphate, potassium hydrogenphosphate, sodium sulfate, potassium sulfate and magnesium sulfate.

3. The process of claim 1, wherein said water-soluble high polymer is modified by hydrolysis, methylolation, sulfomethylation, the Hofmann degradation reaction, or the Mannich reaction of carbamoyl groups and conversion of tertiary to quaternary amino groups.

4. The process of claim 1, wherein said water-soluble high polymer is contacted with an alkaline reagent in an aqueous solution of said salt selected from the group consisting of carbonates, phosphates, and hydrogenphosphates of sodium and potassium to hydrolyze the carbamoyl groups of said high polymer.

5. The process of claim 1, wherein said water-soluble high polymer is contacted with a dialkyl sulfate in an aqueous solution of said salt selected from the group consisting of sulfates of sodium, potassium and magnesium to alkylate the tertiary amino groups of said high polymer.

6. The process of claim 1, wherein said water-soluble high polymer is a copolymer composed mainly of acrylamide or methacrylamide having a molecular weight of more than 200,000, in which the content of acrylamide or methacrylamide units is more than 15 mole percent and that of the units possessing ionic groups is less than 15 mole percent in the copolymer.

7. A process for the modification of a watersoluble high polymer, which comprises: dispersing at least one water-soluble high polymer selected from the group consisting of polyacrylamide, polymethacrylamide, copolymers composed mainly of acrylamide, and copolymers composed mainly of methacrylamide in an aqueous solution of a water-soluble salt, said salt selected from the group consisting of alkali metal and magnesium sulfates, wherein the concentration of said salt in said aqueous solution is sufficient to prevent the elution of said polymer from said solution and is not less than 15 wt. % based on the amount of salt in water; and contacting said water-soluble high polymer dispersed in the aqueous solution with formaldehyde and a primary or secondary amine to aminoalkylate the carbamoyl groups of said high polymer.

8. The process of claim 7 wherein said water-soluble high polymer is a copolymer composed mainly of acrylamide or methacrylamide having a molecular weight of more than 200,000, in which the content of acrylamide or methacrylamide units is more than 50 mole % and that of the units possessing ionic groups is less than 15 mole % in the copolymer.

9. The process of claim 7 wherein said sulfate is sodium, potassium or magnesium sulfate.

10. The process of claim 7 wherein said polymer is polyacrylamide.

11. The process of claim 7 wherein said salt is sodium sulfate.

12. The process of claim 7 wherein said salt is magnesium sulfate.

* * * * *